J. R. WILLIAMS.
Dies for Swaging Horseshoes.

No. 225,258. Patented Mar. 9, 1880.

Attest:
Geo. T. Smallwood Jr.
Walter Allen

Inventor:
John R. Williams
By Knight Bro
attys

2 Sheets—Sheet 2.
J. R. WILLIAMS.
Dies for Swaging Horseshoes.
No. 225,258. Patented Mar. 9, 1880.
Fig. 4,
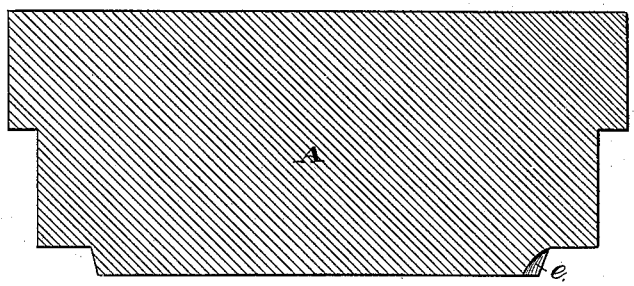
Fig. 5,
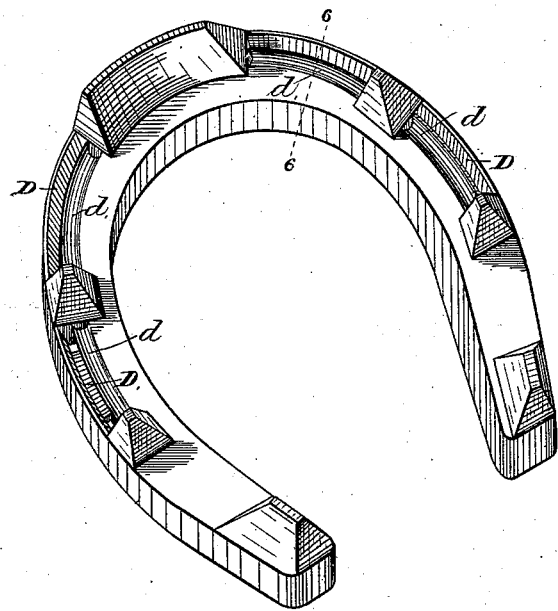
Fig. 6,
Attest:
Geo. T. Smallwood Jr.
Walter Allen
Inventor:
John R. Williams
By Knight Bros
attys.

UNITED STATES PATENT OFFICE.

JOHN R. WILLIAMS, OF JOHNSTOWN, PENNSYLVANIA, ASSIGNOR TO CAMBRIA IRON COMPANY.

DIE FOR SWAGING HORSESHOES.

SPECIFICATION forming part of Letters Patent No. 225,258, dated March 9, 1880.

Application filed December 19, 1879.

*To all whom it may concern:*

Be it known that I, JOHN R. WILLIAMS, of Johnstown, in the county of Cambria and State of Pennsylvania, have invented a new and useful Improvement in Dies for Swaging Horseshoes, of which the following is a specification.

My present improvements in dies for swaging and finishing horseshoes consist in the provision of protuberances on the surface of the bed-die on the inner side of the respective nail-creases, for the purpose of swaging the inner wall of the crease over toward the outer wall of the crease, in order to impart to the creases an oblique shape, inclining inward from the outer edge of the shoe, so as to adapt them to give the proper inclination to the nails, especially those near the front, to cause them to penetrate the hoof to the requisite depth and prevent them from emerging from the oblique front wall of the hoof too near its lower extremity.

In order that my invention may be fully understood, I will proceed to describe it with reference to the accompanying drawings, in which—

Figure 1:
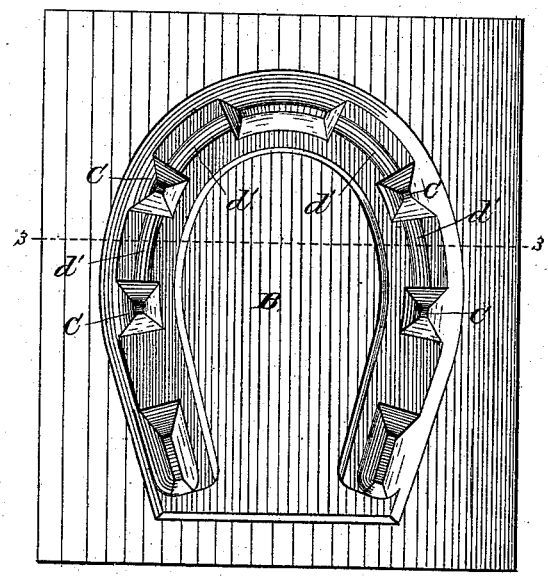
Figure 2:
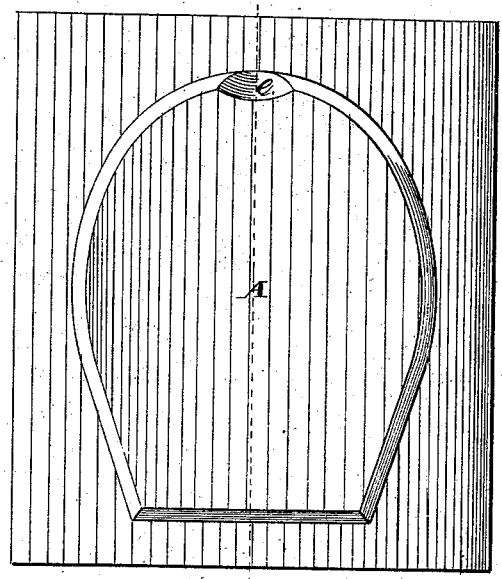
Figure 3:
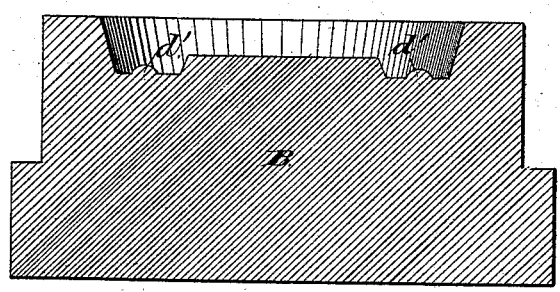

Figure 1 is a view of the upper or working face of the bed-die. Fig. 2 is a view of the under or working face of the upper die. Fig. 3 is a transverse vertical section of the bed-die on line 3 3, Fig. 1. Fig. 4 is a longitudinal vertical section of the upper die on the line 4 4, Fig. 2. Fig. 5 is a perspective view of the under side of a shoe as swaged in my improved dies. Fig. 6 is a transverse section thereof on the line 6 6, Fig. 5.

B is the bed-die, adapted to impart the desired shape and finish to the under side of a horseshoe. I have shown at C C depressions or pockets for the reception of calks, as described in my Patent No. 182,731, dated the 26th of September, 1876; but these are not essential to my present invention. My present improvements are equally applicable to the finishing of horseshoes with or without calks.

D D represent nail-creases formed in the shoe or the blank, preferably by means of machinery which I have described in a separate application for Letters Patent. In order to impart to these nail-creases an inward inclination, especially at the front of the shoe, I form upon the bed-die B protuberances $d'$ $d'$, which, when the metal is under pressure between the dies, have the effect of producing depressions $d$ in the surface of the shoe, the metal thus displaced being pressed over the upper part of the nail-creases, so as to give their inner wall the represented undercut or inclined shape in order to aid in imparting the proper inclination to the nails to cause them to penetrate the hoof to the requisite depth and not emerge or run out too near its extremity. The top die, A, is formed with a depression or pocket, $e$, for the reception of the toe-clip or toe-rest, which is formed on the blank or on the shoe at a previous operation. This pocket serves to protect the said toe-clip from distortion or injury under the swaging pressure, and also to impart the final shape and finish thereto.

The dies are so formed and proportioned as to adapt them to impart the final finish to a horseshoe of any size, style, or shape, the present invention not being limited in its application to horseshoes of any special construction.

Having thus described my invention, the following is what I claim as new and desire to secure by Letters Patent:

A die for imparting final shape or finish to horseshoes, formed with protuberances $d'$ $d'$ on its face, to swage the inner wall of the crease over toward the outer wall of the crease, in order to leave an oblique or undercut crease, as hereinbefore described.

JOHN R. WILLIAMS.

Witnesses:
OCTAVIUS KNIGHT,
WALTER ALLEN.